(12) United States Patent
Hirayama (10) Patent No.: US 7,998,630 B2
(45) Date of Patent: Aug. 16, 2011

(54) FUEL CELL

(75) Inventor: Tomohiro Hirayama, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1177 days.

(21) Appl. No.: 11/728,842

(22) Filed: Mar. 26, 2007

(65) Prior Publication Data
US 2008/0063913 A1   Mar. 13, 2008

(30) Foreign Application Priority Data
Sep. 8, 2006   (JP) ................ P2006-244756

(51) Int. Cl.
*H01M 8/06* (2006.01)
(52) U.S. Cl. .......... 429/424; 429/455; 429/479
(58) Field of Classification Search .......... 429/424
See application file for complete search history.

(56) References Cited

U.S. PATENT DOCUMENTS
2003/0003336 A1 *   1/2003   Colbow et al. ............ 429/24

FOREIGN PATENT DOCUMENTS
JP   2006085971   3/2006
* cited by examiner

*Primary Examiner* — Ula C Ruddock
*Assistant Examiner* — Jacob Marks
(74) *Attorney, Agent, or Firm* — Blakely, Sokoloff, Taylor & Zafman LLP (57) ABSTRACT

According to one embodiment, a fuel cell includes a fuel tank that stores a liquid fuel, a power generation section including an anode and a cathode, a first fuel supply section that supplies the liquid fuel from the fuel tank to the anode, an oxygen supply section that supplies oxygen to the cathode, and a second fuel supply section that supplies the liquid fuel from the fuel tank to the cathode. The power generation section generates power by a chemical reaction of the liquid fuel and the oxygen.

9 Claims, 6 Drawing Sheets

FIG. 6

FUEL CELL

CROSS-REFERENCE TO RELATED APPLICATIONS

This application is based upon and claims the benefit of priority from Japanese Patent Application No. 2006-244756, filed Sep. 8, 2006 the entire contents of which are incorporated herein by reference.

BACKGROUND

1. Field

One embodiment of the invention relates to a fuel cell, and more particularly, to a method for maintaining an output of the fuel cell.

2. Description of the Related Art

Currently, a secondary battery, such as a lithium ion battery, is primarily used as a power source of an electronic device, such as a portable notebook personal computer, mobile equipment, and the like. In response to an increase in power consumption stemming from sophistication of functionality of an electronic device or a request for longer-duration usage of the electronic device, a high-power, recharge-free compact fuel cell has recently been expected as a new power source. Among various types of fuel cells that are available, a direct methanol fuel cell (hereinafter abbreviated as "DMFC") using a methanol solution as a fuel is better than a fuel cell using hydrogen as a fuel in terms of ease of handling a fuel, and a system for DMFC is simple. Since the DMFC can reuse unused fuel discharged during power generation for power generation, DMFC is suitable for use as a power source of a compact electronic device required to operate for a long period of time.

In the DMFC, chemical reaction for power generation is induced at the cathode of stacks by acquisition of air and hence is susceptible to the influence of impurities in the air. JP-A-2006-85971 discloses a fuel cell device having a dust-collection filter disposed at least at one of an air intake, an air intake passage from the air intake to an air-supply pump, and an air-supply passage from an outlet port of the air-supply pump to an air supply port of a fuel-cell power generation section. Dust is eliminated from the air supplied to the power generation section of the fuel-cell power device by means of the dust-collection filter. Hence, a decrease in power-generation performance or a decrease in the life of a battery, which would otherwise be caused as a result of adhesion of dust to an air flow passage or a proton exchange membrane, can be prevented.

However, the above technique has a problem of a failure to prevent intrusion of small dust, or the like, which cannot be caught by the dust-collection filter. For this reason, there may often arise a case where a reaction area is reduced by impurities, such as dust or the like, adhering to the surface of the cathode, resulting in a drop in output.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention. A fuel cell includes a fuel tank that stores a liquid fuel, a power generation section including an anode and a cathode, a first fuel supply section that supplies the liquid fuel from the fuel tank to the anode, an oxygen supply section that supplies oxygen to the cathode, and a second fuel supply section that supplies the liquid fuel from the fuel tank to the cathode. The power generation section generates power by a chemical reaction of the liquid fuel and the oxygen.

Figure 1:
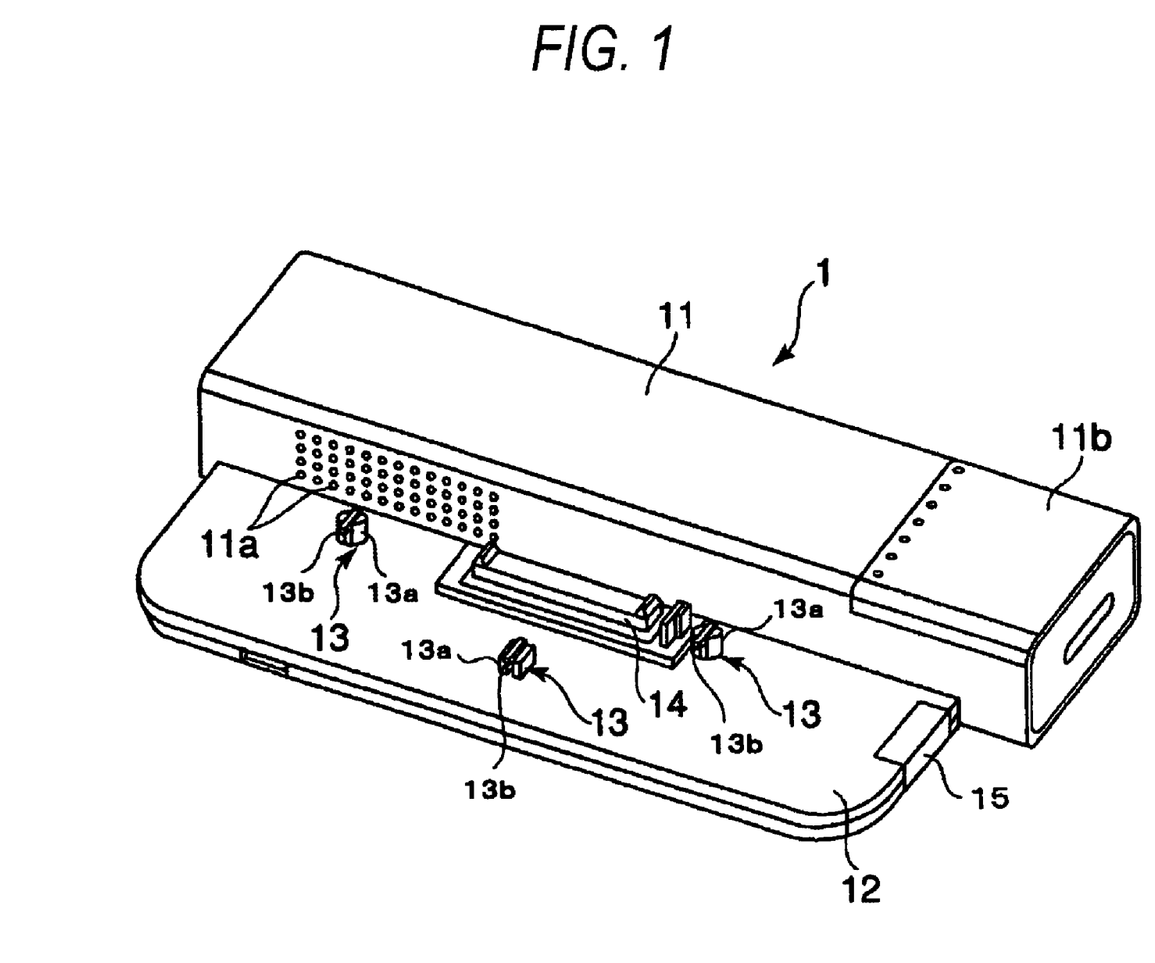
FIG. 1 is an exemplary external perspective view showing a fuel cell according to the present invention.
Figure 2:
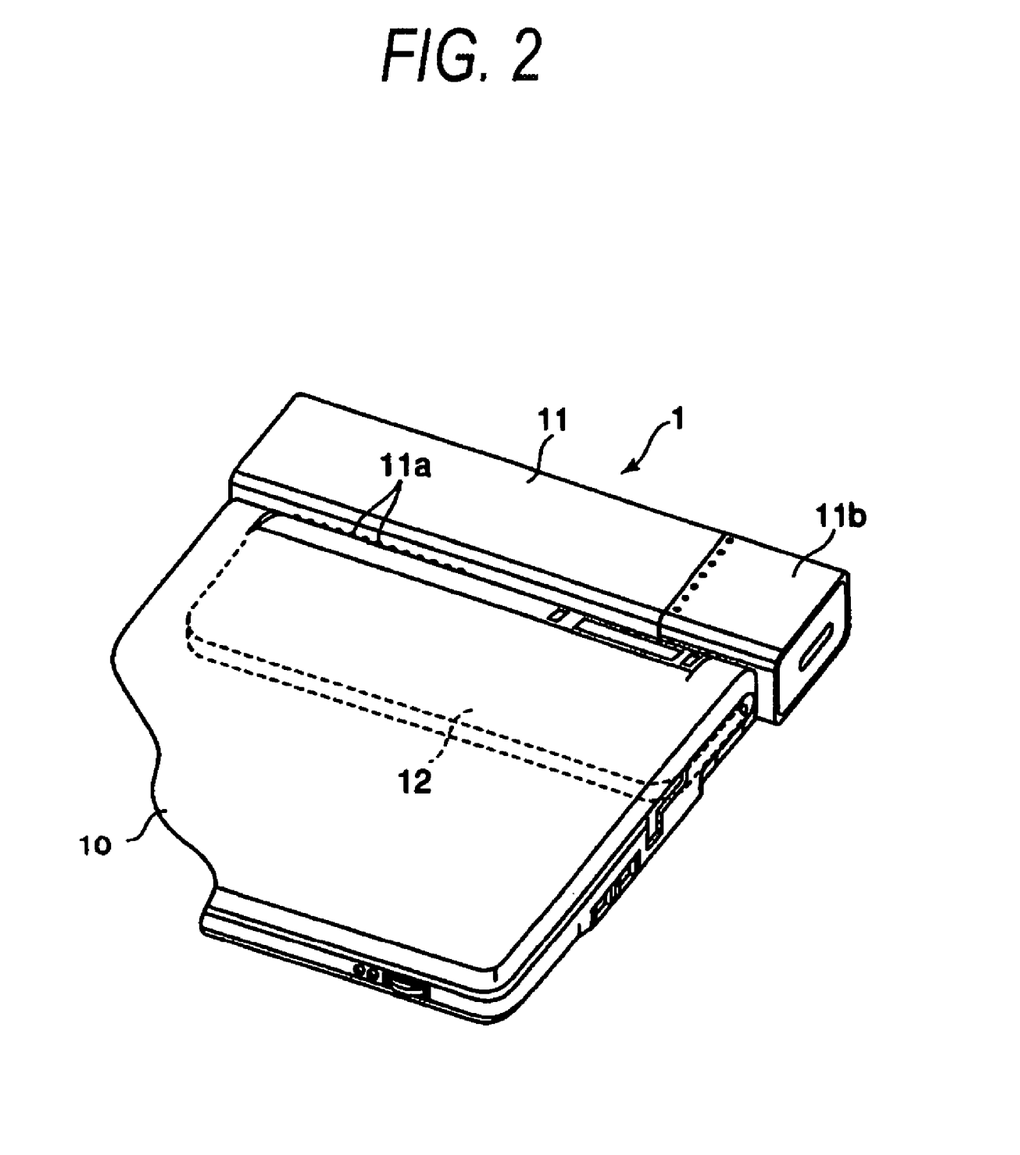
FIG. 2 is an exemplary external perspective view showing that the fuel cell is connected to a notebook computer.

An embodiment of the present invention will be described hereunder by reference to the drawings. FIG. 1 is an external perspective view showing a fuel cell device of the embodiment according to the present invention. FIG. 2 is an external perspective view showing that the fuel cell device is connected to a notebook computer. A fuel cell 1 is used as an external power source of, e.g., a notebook computer 10. The fuel cell 1 is a direct methanol fuel cell (DMFC) and uses, as fuel, a premixed liquid into which methanol and water are mixed. This premixed liquid is caused to chemically react with oxygen in air by means of a proton exchange membrane, thereby generating power. This DMFC is easier to handle than is a fuel cell using hydrogen as fuel, and the entirety of the device can be rendered compact.

The fuel cell 1 has a main body 11 formed into an approximately-rectangular-parallelepiped shape, and a mount section 12 which extends in a flat manner along the bottom of the main body 11. A plurality of venting holes 11a are formed in wall sections of the main body 11. A power-generation unit, which will be described later, is housed in the main body 11. A portion of the main body 11 is formed so as to be removed as a cover 11b. A fuel tank, which will be described later, is placed into an area in the main body 11 defined as a result of removal of the cover 11b.

The mount section 12 is formed so that a rear portion of the notebook computer 10 can be docked with the mount section 12. A control section, which will be described later, is provided in the mount section 12. The control section controls operation of the power-generation unit. Lock mechanisms 13 for establishing coupling with the notebook computer 10 and a connector 14 for supplying the notebook computer 10 with power from the fuel cell 1 are provided on the upper surface of the mount section 12. The lock mechanisms 13 are provided at three positions on the mount section 12, and each of the lock mechanisms 13 has a positioning protuberance 13a and a hook 13b. Engagement holes to be coupled with the lock mechanisms 13 and a socket connected to the connector 14 are provided on the bottom surface of the rear portion of the notebook computer 10.

When the notebook computer 10 is pressed against the mount section 12, the lock mechanisms 13 are inserted into the engagement holes of the notebook computer 10. The notebook computer 10 is retained by the mount section 12 by means of the hooks 13b. Consequently, the socket of the notebook computer 10 is electrically connected to the connector 14. When the switch provided on the main body 11 is actuated in this state, the fuel cell 1 starts generating power.

The mount section 12 further has an eject button 15. When this eject button 15 is pressed, the hooks 13b of the lock mechanisms 13 are released, so that the notebook computer 10 can be removed from the fuel cell 1.

Figure 3:
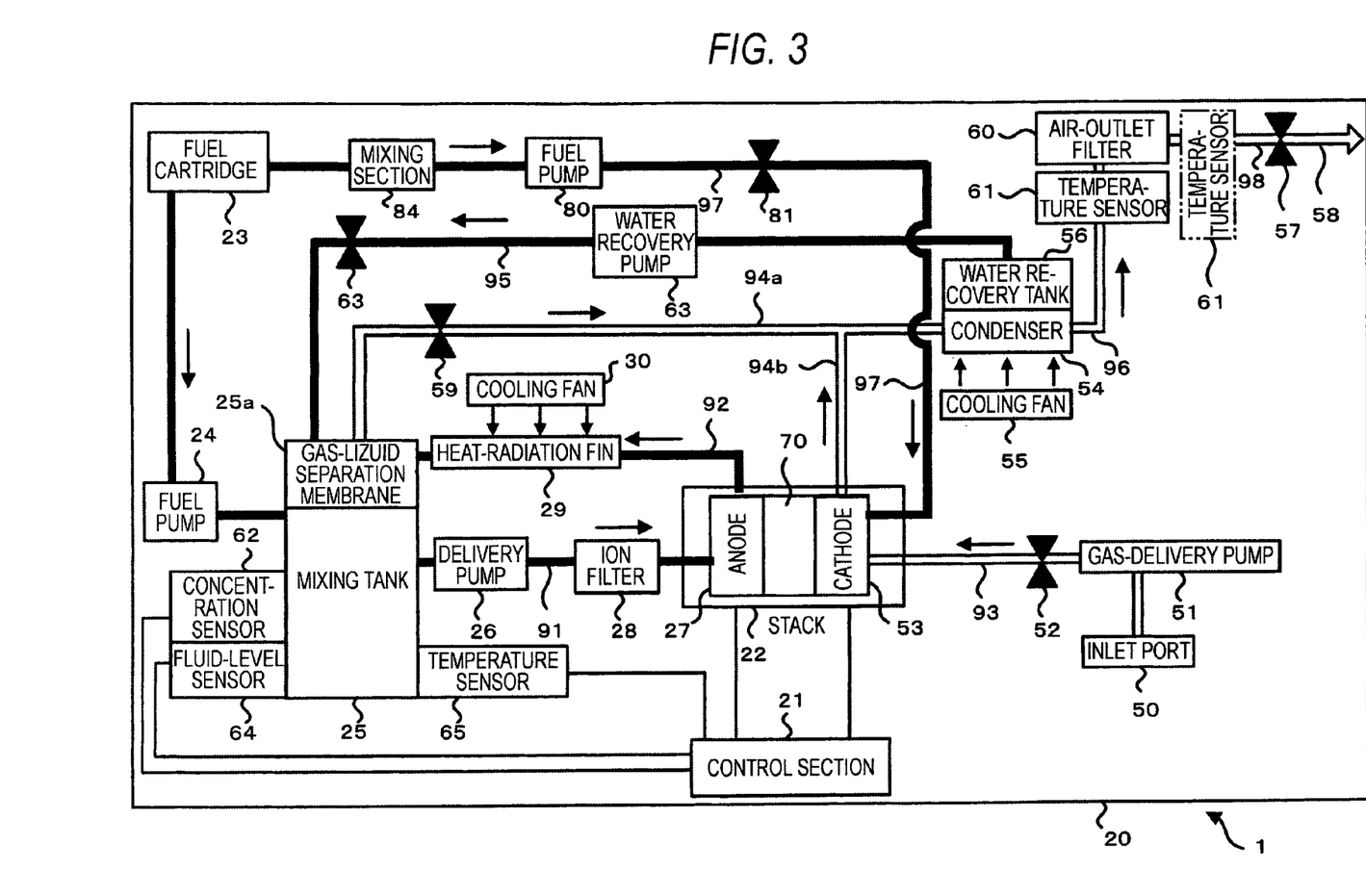
FIG. 3 is an exemplary system diagram of a power-generation system of the fuel cell.
Figure 4:
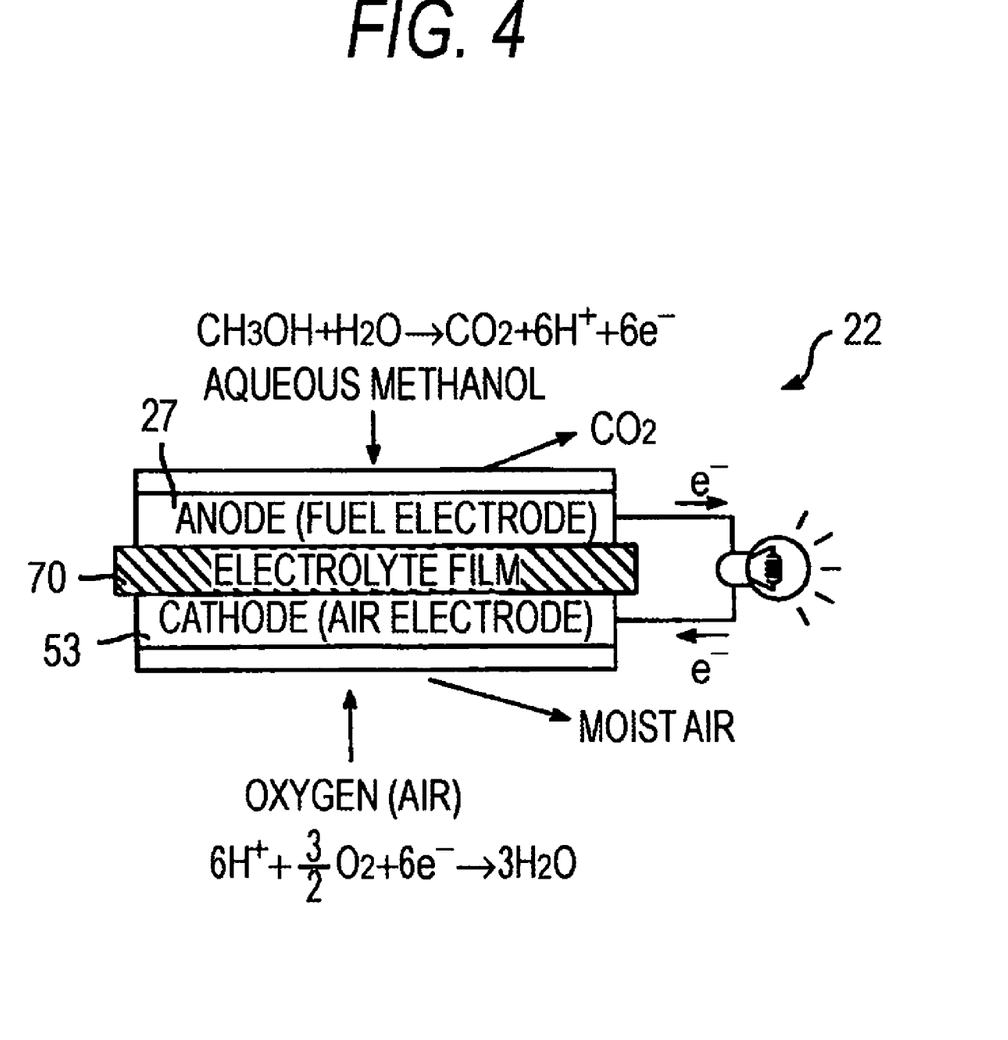
FIG. 4 is an exemplary view schematically showing a cell structure of the power-generation unit.

FIG. 3 is a system diagram of a power-generation system of a fuel cell. FIG. 4 is a view schematically showing the cell structure of the power-generation unit. The fuel cell 1 has a power-generation unit 20, and a control section 21 for controlling operation of the fuel cell 1. In addition to having the function of controlling the power-generation unit 20, the control section 21 has the function of a communication control section for establishing communication with the notebook computer 10. The power-generation unit 20 is provided in the main body 11, and the control section 21 is provided in the mount section 12.

In addition to having a stack 22 that serves as a core of power generation, the power-generation unit 20 has a fuel cartridge 23 for storing methanol serving as fuel. The stack 22 functions as a power-generation section for generating power by means of chemical reaction. High-concentration methanol is sealed in the fuel cartridge 23. The fuel cartridge 23 is made removable so that it can be readily replaced when fuel is consumed.

The power-generation unit 20 has a liquid flow channel through which fuel or another fluid flows, and a gas flow channel through which air or another gas flows. The liquid flow channel is provided with a fuel pump 24 routed and connected to an output section of the fuel cartridge 23; a mixing tank 25 connected to an output section of the fuel pump 24 by way of a pipe; and a solution-delivery pump 26 connected to the output section of the mixing tank 25. The output section of the solution-delivery pump 26 is connected to an anode 27 (a fuel electrode) of the stack 22 by way of a pipe 91. The pipe 91 defines a flow channel used for delivering a methanol solution from the mixing tank 25 to the stack 22.

The mixing tank 25 is provided with a gas-liquid separation membrane 25a. Carbon dioxide, which has been generated as a result of power-generation reaction and circulated to the mixing tank 25, is vaporized in the mixing tank 25. The thus-vaporized carbon dioxide passes through the gas-liquid separation membrane 25a and is finally discharged to the outside from an outlet port 58 along with moist air by way of a pipe 94a. Methanol and air splashed into air after having passed through the gas-liquid separation membrane 25a are recovered and eliminated as a result of passing through an air-outlet filter 60.

An ion filter 28 is provided in the pipe 91 at a location between the solution-delivery pump 26 and the stack 22. The output section of the mixing tank 25 is connected to an anode (a fuel electrode) 27 by way of the solution-delivery pump 26 and the ion filter 28. The ion filter 28 is embodied by use of, e.g., a metal-ion-absorbing substance. The ion filter 28 adsorbs metal ions contained in a methanol solution delivered from the mixing tank 25 to the stack 22 by way of the pipe 91, thereby eliminating metal ions from a methanol solution.

An output section of the anode 27 is connected to an input section of the mixing tank 25 by way of a pipe 92. A pipe 92 defines a flow channel for returning, to the mixing tank 25, a fluid discharged from the anode 27 of the stack 22; namely, an unreacted methanol solution having not been used for chemical reaction, and generated carbon dioxide. The pipe 92 is equipped with a heat-radiation fin 29. The heat-radiation fin 29 acts as an anode cooling section for cooling a methanol solution discharged from the anode 27. A cooling fan 30 is attached to the neighborhood of the heat-radiation fin 29. The temperature of the methanol solution discharged from the anode 27 is, e.g., 60° C. or more. The temperature of the methanol solution is decreased to, e.g., 45° C. to 50° C. or thereabouts, as a result of the methanol solution having passed through the heat-radiation fin 29. The above-mentioned fuel cartridge 23, the fuel pump 24, the mixing tank 25, and the solution-delivery pump 26 constitute a fuel supply section for supplying the stack 22 with fuel.

Meanwhile, the gas flow channel is provided with an inlet port 50 and a gas-delivery pump 51. The gas-delivery pump 51 is connected to a cathode (an air electrode) 53 of the stack 22 by way of a pipe 93 equipped with a gas-delivery valve 52. A condenser 54 is connected to the output section of the cathode 53 by way of pipes 94a, 94b. The output section of the mixing tank 25 is connected to the condenser 54 by way of the pipe 94a equipped with a mixing tank valve 59. The condenser 54 is connected to the outlet port 58 by way of an air-outlet valve 57. The condenser 54 and the air-outlet valve 57 are connected together by way of pipes 96 and 98, and the air-outlet filter 60 and a temperature sensor 61 are interposed between the condenser 54 and the air-outlet valve 57.

The condenser 54 acts as a cathode-cooling section for cooling a fluid (steam or water) discharged from the output section of the cathode 53. The condenser 54 is provided with an unillustrated fin and effectively condenses steam. A cooling fan 55 is disposed opposite the condenser 54. Steam is condensed by means of cooling action of the condenser 54, and the temperature of the water discharged from the output section of the cathode 53 is also lowered, whereby the temperature of water flowing from a water recovery tank 56 reaches 45° C. to 50° C. or thereabouts by way of the pipe 96.

As will be described in detail later, carbon dioxide is evolved at the anode 27 of the power-generation unit 20 along with a power-generation reaction, and water (steam) is generated at the cathode 53. Carbon dioxide evolved at the anode 27 and the methanol solution having not been used for chemical reaction are cooled by the heat-radiation fin 29 after having passed through the pipe 92 and are circulated back to the mixing tank 25.

The carbon dioxide circulated back to the mixing tank 25 is vaporized in the mixing tank 25. The thus-vaporized carbon dioxide passes through the gas-liquid separation membrane 25a, and merges with the pipe 94b extending from the cathode 53 after having flowed from the mixing tank 25 by way of the pipe 94a. Carbon dioxide is caused to flow through the air outlet filter 60 along with the moist air. Carbon dioxide and the moist air are finally discharged to the outside from the outlet port 58 by way of the air-outlet valve 57. Methanol having splashed in air through the gas-fluid separation membrane 25a is removed from the air, and recovered as a result of having passed through the air-outlet filter 60.

In order to eliminate impurities adhering to the surface of the cathode 53 as will be described later, a methanol solution is supplied to the cathode 53. In the embodiment, there is employed a method for supplying a methanol solution from the fuel cartridge 23 by way of a pipe 97 by means of the pump 80. The pipe 97 is equipped with a valve 81 for controlling supply of methanol to the cathode 53. Another method for supplying methanol to the cathode 53 in the form of a gas may also be adopted.

A power-generation mechanism of the power-generation unit 20 in the fuel cell 1 will now be described in terms of the flow of fuel and air (oxygen). As shown in FIG. 4, high-concentration methanol in the fuel cartridge 23 is supplied to the mixing tank 25 by means of the fuel pump 24. The high-concentration methanol in the mixing tank 25 is mixed, in a diluted manner, with recovered water or low-concentration methanol (a residual derived from power-generation reaction) from the anode 27, or the like, whereby a low-concentration methanol solution is generated. The concentration of the low-concentration methanol solution is controlled in such a way that a concentration at which high power-generation efficiency is achieved; e.g., 3% to 6%, is maintained. Concentration control is implemented by means of the control section 21 of the fuel cell 1 controlling the amount of high-concentration methanol supplied to the mixing tank 25 by the fuel pump 24 in accordance with, e.g., a result of detection performed by a concentration sensor 62. Alternatively, concentration control can be implemented by means of controlling the quantity of water circulating back to the mixing tank 25 through use of a water recovery pump 63 and a water recovery valve 66 or the like.

The mixing tank 25 is provided with a fluid level sensor 64 for detecting the fluid level of methanol solution in the mixing tank 25, and a temperature sensor 65 for detecting a temperature. Detection results from these sensors are delivered to the control section 21 and used for controlling the power-generation unit 20.

The methanol solution diluted in the mixing tank 25 is delivered to the stack 22 under pump pressure by the solution-delivery pump 26 by way of the pipe 91 and poured into the anode 27. After metal ions have been eliminated from the methanol solution from the solution-delivery pump 26 by means of the ion filter 28, the water solution is fed to the anode 27 of the stack 22. As shown in FIG. 4, methanol is oxidized at the anode 27, thereby generating electrons. Hydrogen ions ($H^+$) generated through oxidation pass through a solid polymer electrolyte film 70 in the stack 22, to thus reach the cathode 53.

Carbon dioxide generated through oxidation performed at the anode 27 again circulates back to the mixing tank 25 in conjunction with the methanol solution having not been used for reaction. In this case, the methanol solution discharged from the anode 27 is cooled by the heat-dissipation fin 29 and the cooling fan 30, and the thus-cooled methanol solution is delivered to the mixing tank 25. Carbon dioxide is vaporized in the mixing tank 25, and the thus-vaporized carbon dioxide flows toward the condenser 54 by way of the mixing tank value 59 and is finally discharged to the outside from the outlet port 58 by way of the air-outlet valve 57.

After having been taken in by way of the air-inlet port 50 by means of the gas-delivery pump 51 constituting the air supply section and pressurized, air (oxygen) is supplied from the gas-delivery valve 52 to the cathode (air electrode) 53 of the stack 22 by way of the pipe 93. Reducing reaction of oxygen ($O_2$) proceeds at the cathode 53; and water ($H_2O$) is generated, as steam, from electrons (e−) supplied from an external load and hydrogen ions ($H^+$) and oxygen ($O_2$) from the anode 27. The steam is discharged from the cathode 53 and enters the condenser 54. In the condenser 54, the steam is cooled by the cooling fan 55, to thus become water (a fluid), and the water is temporarily stored in the water recovery tank 56. The thus-recovered water is circulated back to the mixing tank 25 by means of the water recovery pump 63, thereby constituting a circulation system which dilutes high-concentration methanol.

Carbon dioxide having circulated from the anode 27 and back to the mixing tank 25 by way of the pipe 92 is vaporized in the mixing tank 25. The thus-vaporized carbon dioxide passes through the gas-fluid separation membrane 25a and flows from the mixing tank 25 into the pipe 94a. The pipe 94a from the mixing tank 25 merges with the pipe 94b from the cathode 53. The moist air derived from cathode reaction flows to the condenser 54 by way of the pipe 94b. The gas flowing through the pipes 94a, 94b contains the moist air derived from cathode reaction and the carbon dioxide having passed through the gas-liquid separation membrane 25a, and hence remains highly hot and moist. Moreover, moist air remaining uncondensed in the condenser 54 is introduced into the pipe 96. Since methanol components contained in the gas discharged from the stack 22 must be purified, rendered harmless, and discharged, the air-outlet filter 60 is disposed at a downstream position with respect to the stack 22. The gas having been rendered harmless by the air-outlet filter 60 is discharged from the air-outlet port 58 to the outside of the fuel cell 1.

Figure 5:
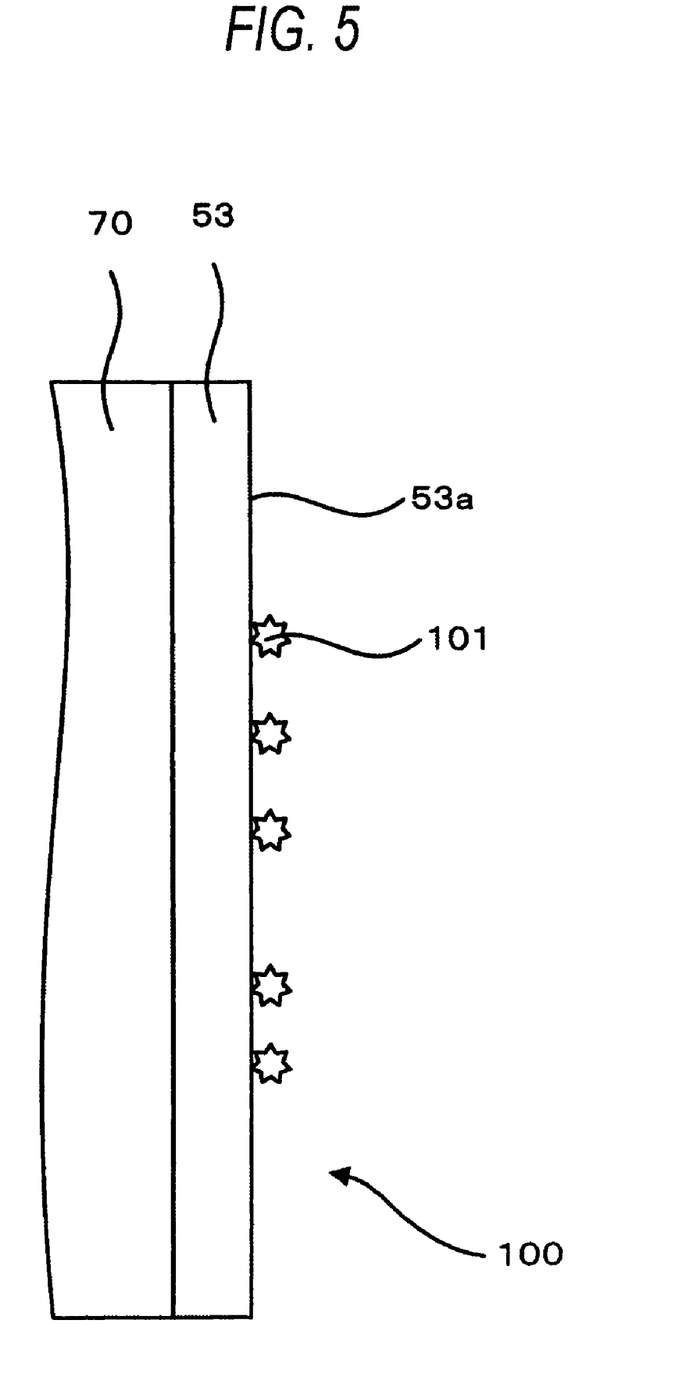
FIG. 5 is an exemplary view schematically showing that impurities adhere to a cathode.

FIG. 5 is a view diagrammatically showing that impurities adhere to the cathode. As mentioned previously, there often arises a case where fine particles 101 corresponding to impurities adhere to the surface 53a of the cathode 53. When the fine particles 101 have adhered to the surface of the cathode, a decrease arises in the number of sites on the surface 53a of the cathode 53 where reaction arises, and hence reaction efficiency for power generation is deteriorated. The cathode 53 is equipped with an unillustrated filter for adhering and removing the dust contained in the air introduced from the air-inlet port 50 or a volatilized organic solution.

However, fine particles of an organic solvent, or the like, contained in the air often pass through the air-inlet filter. When the fine particles 101 having passed through the air-inlet filter have adhered to the surface 53a of the cathode 53 as impurities, the fine particles 101 serving as impurities occupy the sites where chemical reactions arise. When reaction for reducing oxygen to water, which is regular reaction, is hindered as a result of adhesion of the fine particles 101 to the surface 53a of the cathode 53, there arises a problem of an output from the fuel cell being deteriorated. Consequently, in order to prevent occurrence of an output drop, elimination of the impurities adhering to the surface 53a of the cathode 53 is required to prevent occurrence of a decrease in output.

Figure 6:
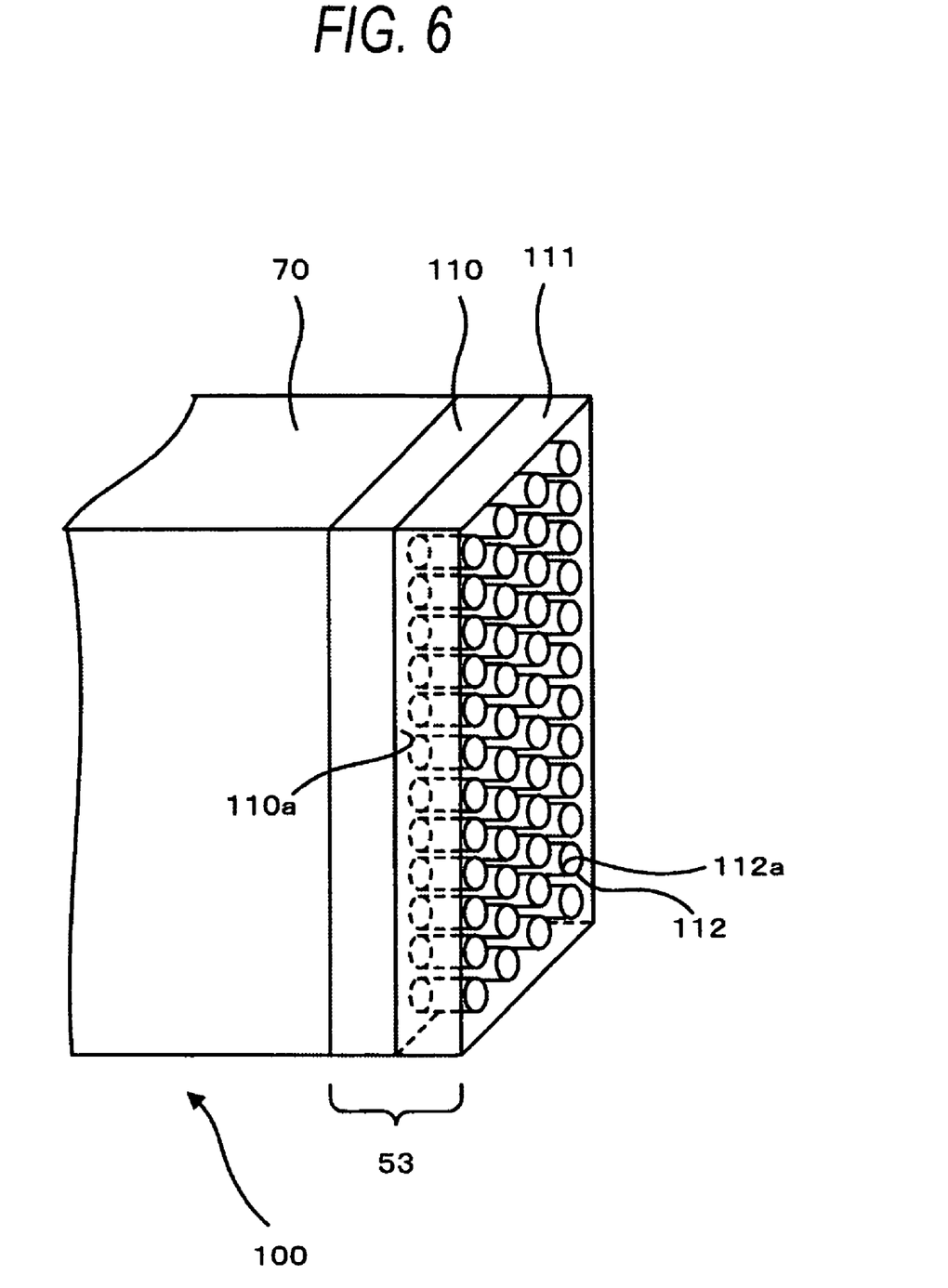
FIG. 6 is an exemplary view showing details of the structure of the cathode.

FIG. 6 is a view showing details of the structure of the cathode. The cathode 53 includes a chemical reaction layer 110 and a gas diffusion layer 111. For instance, platinum or the like is used for the chemical reaction layer 110. A substance for permitting transmission of oxygen used for chemical reaction at the cathode 53 is desired for the gas diffusion layer 111. For instance, porous carbon materials, or the like, maybe used. A plurality of venting holes 112 are formed in the gas diffusion layer 111, and a catalyst layer 112a, such as platinum or the like, is deposited on the interior surface of the venting holes 112 in order to promote the chemical reaction. Platinum fine particles are densely dispersed over the surface 110a of the chemical reaction layer 110.

When impurities adhere to the surfaces of platinum fine particles dispersed over the chemical reaction layer 110, reaction efficiency for power generation is decreased. When the temperature of the chemical reaction layer 110 has increased by heating, or the like, the fine particles 101 that are impurities react with oxygen, to thus form an inactive substance; for example, carbon dioxide. The fine particles 101 turn into inactive substances and are detached from the surface of the chemical reaction layer 110. Moreover, when the temperature of the chemical reaction layer 110 has increased, molecular motion of the fine particles 101 becomes active, and the fine particles 101 become detached from the surface of the chemical reaction layer 110. The fine particles 101 enter a chemical state where the fine particles cannot adhere to the chemical reaction layer 110. When the fine particles have been detached from the surface 110a of the chemical reaction layer 110, the chemical reaction layer 110 is purified. Sites in the cathode 53 where chemical reaction for power generation arises are increased by purification of the chemical reaction layer 110, and reaction efficiency is increased. When the chemical reaction layer 110 has been made normal, regular cathode reaction is promoted, and an output from the fuel cell 1 is restored to a normal state.

A method for locally heating only the cathode 53 by utilization of heat of reaction induced during chemical reaction is useful as a method for increasing the temperature of the chemical reaction layer 110. An example method is to supply the chemical reaction layer 110 of the cathode 53 with fuel in the fuel cartridge 23, to thus mix the fuel with the oxygen supplied from the gas-delivery pump 51 and induce chemical reaction. Utilization of heat of reaction induced during chemical reaction on the cathode 53 is preferable.

In addition to the method for supplying oxygen from the gas-delivery pump 51, a method for previously mixing the liquid fuel supplied from the fuel cartridge 23 with oxygen in the pipe 97 can also be adopted as the method for supplying the cathode 53 with oxygen. When this method is adopted, a mixing section 84 is provided in the pipe 97, the liquid fuel supplied from the fuel cartridge 23 is mixed with oxygen, and the thus-mixed fuel is supplied to the cathode 53.

In order to efficiently induce chemical reaction which evolves heat, the catalyst layer 112a, such as platinum, is provided in each of the venting holes 112 of the gas diffusion layer 111. Reaction efficiency is increased with an increase in the surface areas of the venting holes 112 of the gas diffusion layer 111, and hence dense arrangement of the venting holes 112 is desirable.

A fuel supplied to a cathode chemical reaction layer from the fuel cartridge may be a liquid component or a gaseous component. A feed rate can be controlled by the pump 80 or the valve 81 provided in the pipe 97. The feed rate is controlled by means of measuring the temperature of the cathode section or the temperature of the discharging port of the cathode, so as to approach a target temperature. The temperature achieved at this time is controlled to a temperature range where no changes arise in the characteristic of the solid polymer electrolyte film 70 in the stack 22.

In order to recover the output from the fuel cell, a fuel may be supplied to the cathode 53 at any time. A fuel is desirably supplied when a decrease of a given level or more has arisen in the output; for example, when the output has decreased by 5% for one hour. Fuel is supplied to the cathode 53 when the load on the stack 22 is disconnected. A predetermined amount of air must be fed while fuel is being supplied from the fuel cartridge 23 to the cathode 53.

When the fuel is supplied to the cathode 53, the fuel reacts with the impurities adhering to the surface of the cathode 53. Consequently, the impurities turn into an inactive substance, or molecular motion of the impurities becomes active. Thus, the impurities are detached from the surface of the cathode 53. When the surface of the cathode 53 has been purified as a result of removal of the impurities from the surface, the number of sites where chemical reaction for power generation arises is increased, and the output can be recovered.

According to the embodiment of the present invention, there can be provided a fuel cell capable of preventing a decrease in output to thus maintain an output of given level or higher. Although the above description is provided by means of taking a DMFC fuel cell as an example, a fuel cell using hydrogen fuel or a fuel-reformed fuel cell using liquid fuel may also be adopted in addition to the DMFC fuel cell.

The above embodiment has been presented by example only, and is not intended to limit the scope of the inventions. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the inventions.

For example, the temperature sensor 61 may be disposed between the air-outlet filter 60 and the air-outlet valve 57, as shown by the double chain line in FIG. 3.

What is claimed is:

1. A fuel cell comprising:
    a fuel tank that stores a liquid fuel;
    a power generation section including an anode and a cathode;
    a first fuel supply section that supplies the liquid fuel from the fuel tank to the anode;
    an oxygen supply section that supplies oxygen to the cathode; and
    a second fuel supply section that supplies the liquid fuel from the fuel tank to the cathode;
    wherein the power generation section generates power by a chemical reaction of the liquid fuel supplied to the anode by the first fuel supply section and the oxygen supplied to the cathode by the oxygen supply section; and
    wherein output from the fuel cell is recovered by supplying fuel to the cathode from the second fuel supply section when a decrease of a given level or more has arisen in the output.

2. The fuel cell according to claim 1, wherein the cathode comprises:
    a chemical reaction layer in which the oxygen chemically reacts; and
    a diffusion layer stacked on the chemical reaction layer, the diffusion layer having a venting hole.

3. The fuel cell according to claim 2, wherein the venting hole has a catalyst layer that acts as a catalyst of the chemical reaction.

4. The fuel cell according to claim 1, further comprising:
    a temperature measurement section that measures a temperature of the power generation section; and
    a control section that controls a supply of the liquid fuel from the fuel tank to the cathode, in accordance with the temperature of the cathode.

5. The fuel cell according to claim 4, wherein the second fuel supply section comprising:
    a pipe that flows the liquid fuel from the fuel tank directly to the cathode; and
    a valve disposed in the pipe;
    wherein the control section controls the supply by opening and closing the valve.

6. A fuel cell comprising:
    a fuel tank that stores a liquid fuel;
    a power generation section including an anode and a cathode;
    a first fuel supply section that supplies the liquid fuel from the fuel tank to the anode;

a oxygen supply section that supplies oxygen to the cathode; and
a second fuel supply section that supplies the liquid fuel from the fuel tank to the cathode;
wherein the power generation section generates a power by a chemical reaction of the liquid fuel supplied to the anode by the first fuel supply section and the oxygen supplied to the cathode by the oxygen supply section; and
wherein the second fuel supply includes a pipe that flows the liquid fuel from the fuel tank to the cathode to recover output from the fuel cell when a decrease of a given level or more has arisen in the output.

7. The fuel cell according to claim 6, further comprising:
a mixing section that is provided on the pipe, and that mixes the liquid fuel supplied from the fuel tank with oxygen.

8. The fuel cell according to claim 6, wherein the given level is a decrease in the output by 5% for one hour.

9. The fuel cell according to claim 1, wherein the given level is a decrease in the output by 5% for one hour.

* * * * *